Nov. 5, 1963

P. LOHSE ET AL 3,109,561

APPARATUS FOR WEIGHING OUT AND DISCHARGING POURABLE MATERIAL

Filed Aug. 30, 1961

United States Patent Office 3,109,561
Patented Nov. 5, 1963

3,109,561
APPARATUS FOR WEIGHING OUT AND DIS-
CHARGING POURABLE MATERIAL
Paul Lohse and Adolf Stambera, Stuttgart-Bad Cannstatt,
Germany, assignors to Fr. Hesser Maschinenfabrik-
Aktiengesellschaft, Stuttgart-Bad Cannstatt, Germany,
a corporation of Germany
Filed Aug. 30, 1961, Ser. No. 134,958
4 Claims. (Cl. 222—77)

This invention is related to apparatus for weighing out pourable or loose material in net weights and for discharging the weighed quantities into packaging containers.

Automatic net-weight discharge weighers are already known, which weighers, to increase their weighing capacity, operate in two stages. In the first stage an approximate amount of material below the target weight first is measured out volumetrically or gravimetrically into a vessel from which the material is poured into the pan of a weigher for further weighing. The weigher then in a second stage controls a fine feed of the material to the rough quantity to make up the target weight. When the latter weight is reached, the feed of material is interrupted, and the pan is emptied. In weighers of the above type the dispensation of the approximate quantity into the weigh pan, the weighing, and the make-up by the fine flow consume time, and even with improved and refined forms of such apparatus, no substantial increase in capacity is achieved.

In the case of gross discharge weighers, the measuring out of the quantities of filling material is performed in three operations. In this case a pre-dispensed approximate amount of material is first charged into a packaging container, the weight of this quantity, i.e. its deficiency from the target figure is then determined by means of a weigher at a further operation station. The latter weigher controls a make-up device arranged at a third station in the apparatus to cause the make-up device to dispense the deficiency in the weight of material into the packaging container immediately upon arrival of the latter at the third station.

It is an object of the invention to apply this last described method of weighing to an apparatus for weighing-out net weights of loose materials. Moreover, the latter apparatus is constructed so that it has a substantially increased filling capacity.

A further object of the invention is to provide apparatus in which a plurality of simultaneously operating weighing and dispensing devices are arranged along a circulating conveyor device so that simultaneous dispensing of measured quantities can be made to a plurality of packages so as to increase the total capacity of a packaging machine even further.

According to the invention there is contemplated apparatus for weighing out and discharging pourable material, comprising a frame, a rotatable carrier on said frame, a plurality of holders freely mounted on said carrier, means for rotating said carrier stepwise to bring the holders to successive stations around said frame, a pre-dispensing device at a first station, adapted to deliver pourable material into the holders as they are arrested at said station, a control weigher at a second station to receive and weigh the material in successive holders, a make-up device at a third station adapted to deliver pourable material into successive holders, the make-up device being provided with means response to the weight in successive holders as determined by said control weigher to control the amounts of material delivered by said make-up device to said holders, and means for discharging material from each said holder at a discharge station.

An apparatus constructed in accordance with an embodiment of the present invention for weighing and discharging loose mtaerials into packages will now be described by way of example with reference to the accompanying diagrammatic drawing. In the drawing.

Figure 1:
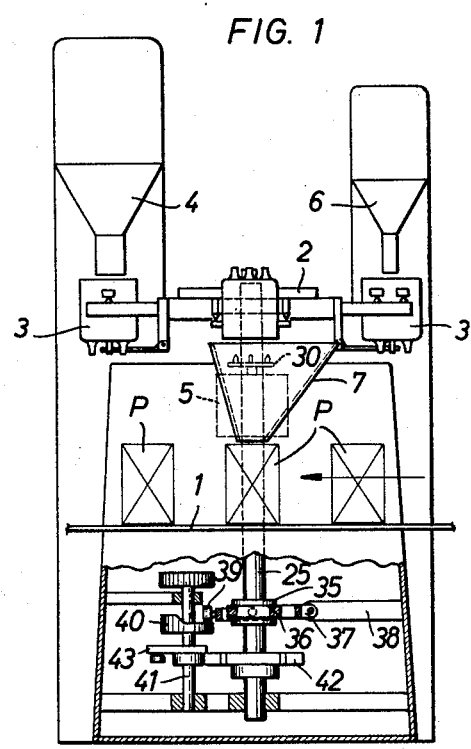
FIGURE 1 is a front view of the apparatus, shown partly broken away.

The apparatus shown in the drawings comprises a weighing and discharging device which is associated at the discharge station of a packaging machine in association with a conveyor device 1, which may be a rectilinearly moving conveyor. The discharging device is adapted for feeding material into packaging containers P on the moving conveyor.

Figure 2:
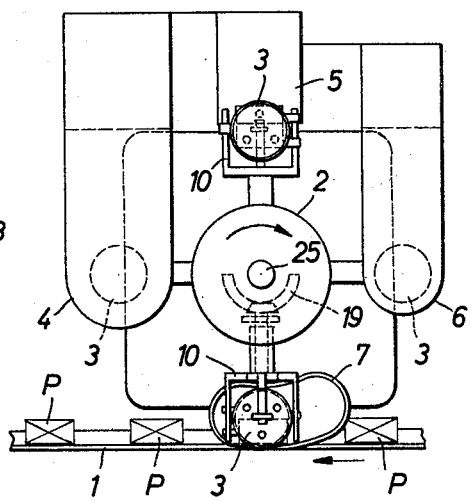
FIGURE 2 is a plan view of the apparatus shown in FIGURE 1.
Figure 3:
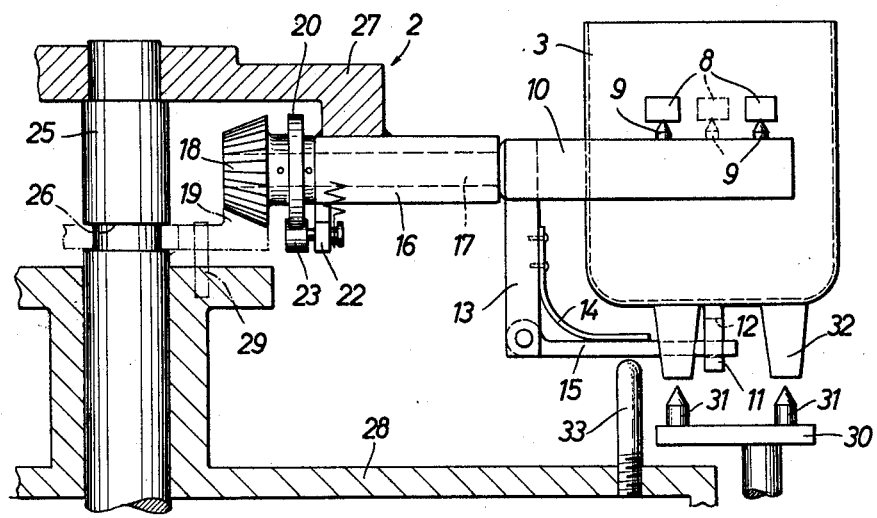
FIGURE 3 is an enlarged side view, partly in section, of a weighing vessel illustrating the mounting thereof in the apparatus of the invention.

The weighing and discharging device includes a four-armed conveyor star 2 which is intermittently rotatable in the direction of the arrow in FIGURE 2 and carries a holder 3 on each of its arms. Holders 3, on rotation of the conveyor star 2, are brought in turn to a dispensing device 4, which dispenses a certain approximate quantity of material, which is less than the target weight, into each of the holders. The dispensing device 4 can be of conventional form, for example it may be a screw dispensing device of the kind shown in U.S. Patent No. 2,643,026. After a further rotational step of the conveyor star 2, the actual weight of the approximate quantity pre-dispensed into holder 3 at dispenser 4 is determined by a suitable weigher 5, which is preferably electronically operated.

Weigher 5 controls a make-up device 6, which is arranged at the next station corresponding to a further rotational step of the conveyor star 2, and the make-up device may be, for example, a screw dispensing device of the same form as the dispensing device 4. The make-up device 6 is adapted to dispense exactly the amount of material necessary to make up the target weight. There are a variety of known systems which can be used to provide the control of the make-up device 6, as for example the electronic control system described in U.S. Patent No. 2,722,640. Make-up device 6 is, of course, operated so as to deposit the material necessary to make up the deficiency in weight in holder 3 in said holder when the latter arrives at the station whereat device 6 is located after a rotational step of the conveyor star 2 from weigher 5. After a still further step, the holder 3 reaches the last station, which coincides with the discharging step of the conveyor device 1, and the net weight of material in holder 3 is discharged into a packaging container P by a tilting of the holder 3 above a filling hopper 7.

The weighing holders 3 each have three projections or noses 8 resting on taper-ended pins 9 of a fork 10 mounted on the corresponding arm of the conveyor star 2. To prevent the weighing holders 3 from dropping out of their respective forks 10 when tilted, a slotted lug 11 projects downwards from the bottom of each of the holders. A finger 15, which is rotatably mounted on a vertical arm 13 on each fork 10 and is subject to the action of an arcuately bent leaf spring 14, engages in the slot 12 in the lug 11 and urges, under the action of spring 14, the noses 8 downwardly against the pins 9.

Each fork 10 is secured to a spindle 17 which is rotatably mounted in a fixed bearing 16 on the hub 27 of the conveyor star 2, the purpose of this arrangement being is to allow tilting and emptying of the holders 3. Thus, each shaft 17 has at the end opposite the fork 10 thereof a bevel wheel 18 which, at the station preceding the discharge station of the conveyor device 1, engages a toothed segment 19 with the result that, as the conveyor star 2 is rotated through the next step, the bevel wheel 18 and the associated holder 3, are rotated through 180° to invert the holder and empty the same.

When the conveyor star 2 is rotated through the step following the emptying of the holder 3, the holder 3 is rotated again through 180° back to its original position. It will be noted from FIGURE 2 that the toothed segment 19 covers a 180° range. Furthermore, segment 19 is mounted in an annular groove 26 in the vertical central shaft 25. The latter carries the conveyor star 2 and the hub 27 of bearings 16. The segment 19 is secured to the housing 28 and prevented from rotating by bolts 29 mounted in the housing 28 of the bottom frame.

To guarantee proper engagement between each of the bevel wheels 18 and the toothed segment 19, a disc 20 secured to each spindle 17 has a recess therein for receiving a roller 23 which is rotatably mounted on a spring-biassed rocking lever 22, the latter being pivotally mounted on the associated hub 27. When the roller 23 is snapped into the recess in the disc 20, not only is the associated bevel wheel 18 brought uniformly into the proper position for engagement with the toothed segment 19, but the corresponding holder 3 is also prevented from becoming loose on its supports.

To weigh out the pre-dispensed approximate quantities of material, the holders 3 are placed in turn on to the weighing plate 30 of the weigher 5 by a lowering of the shaft 25. Feet 32 on each holder 3 then freely rest on tapered pins 31 provided on weighing plate 30. When the holders 3 are placed on the weighing plate 30, the finger 15 is pivoted upwards, against the action of leaf spring 14, in the slot 12 in the lug 11 by an abutment pin 33 which is fixedly mounted in the housing 28 of the apparatus at the station corresponding to the location of weigher 5. This lifts the noses 8 from the pins 9.

To permit downward movement of the shaft 25, the latter has mounted thereon a sleeve 35 having an annular groove in which is held a ball race 36 carried by a lever 37. Lever 37 is pivotally connected to a fixed arm 38 and has, at the free end thereof, a roller 39 which runs on a face cam 40. Cam 40 is fastened to a drive shaft 41 and controls the vertical movements of the shaft 25 in such a way that the latter is lowered each time the conveyor star 2 comes to a standstill in its rotary travel and is raised again shortly before the next rotational step of the conveyor star.

The shaft 25 and the conveyor star 2 are rotated intermittently by a maltese gear, the cross 42 of which is fastened to the shaft 25 and the driver 43 to the shaft 41.

As has already been indicated, the dispensing device 4 can assume various forms, amongst which may be a known type which operates directly on a volumetric basis and has measuring chambers, or the device 4 can be a vibratory chute which operates on a time basis. Similarly, the make-up device 6 can comprise a device in which a plurality of small quantities of specific weights of material are kept in readiness and then discharged into the holders 3 at selected periods.

Furthermore, the make-up device 6 may be situated directly at the discharge station of the apparatus so that the make-up operation takes place simultaneously with the discharging of the material from the holders 3 into the packaging containers P. The holders 3 may, in this case, be furnished with bottom flaps which open at the discharge station. It is also possible with the latter arrangement to make the holders 3 of tapered form and to mount them in rings on the conveyor star 2 so that, when the star is lowered, the holders are left free-standing on the weigh plate 30.

We claim:

1. Apparatus for weighing out and discharging pourable material, comprising a rotatable multi-armed star, a bearing sleeve on each of the arms of said star, a radial spindle rotatably supported in each of said sleeves, a fork supported on each said spindle, a bevel wheel secured to each said spindle, an open-topped holder detachably seated on each said fork, means supporting said star for rotation stepwise to move each arm thereof through successive stations, a dispensing device supported at a first station and adapted to deliver pourable material into a holder arrested at said first station, a control weigher supported at a second station to receive and weigh successive holders, a make-up device supported at a third station and adapted for delivering pourable material into a holder arrested at said third station, the make-up device being provided with means responsive to the weight detected by said control weigher for controlling the amount of material delivered by said make-up device to each holder so that a preselected quantity is ultimately provided in each holder, a toothed segment and means fixedly supporting the toothed segment with respect to the star and in the path of movement of the bevel wheels which are secured to the spindles of said star such that each bevel wheel meshes with the toothed segment during rotation of said star to thereby rotate said fork and tilt the holder for discharge of the contents therefrom.

2. Apparatus for weighing out and discharging pourable material, comprising a rotatable multi-armed star, a holder, needle supports, means supporting the needle supports from one of said arms, said holder resting on said needle supports and being supported thereby, means for rotating said star stepwise to move each arm thereof through successive stations, a dispensing device supported at a first station and adapted to deliver pourable material into said holder with the latter arrested at said first station, a control weigher supported at a second station to receive and weigh said holder, means for raising and lowering said star, a make-up device supported at a third station and adapted for dispensing pourable material into said holder with the latter arrested at said third station, the make-up device being provided with means responsive to the weight of material in said holder as determined by said control weigher to control the amount of material dispensed by said make-up device to said holder, and means for discharging material from said holder at a discharge station.

3. Apparatus as claimed in claim 2 comprising depending feet on the holder, and needle supports on the control weigher for engaging the feet on the holder to support the latter free of the associated star arm when the latter has been lowered.

4. Apparatus for weighing out and discharging pourable material, comprising a rotatable multi-armed star, an open-topped holder for each arm of said star, projections on each of said holders, a forked member on each of said arms embracing a corresponding one of said holders, needle supports on each of the forked members engaging said projections on the associated holder from therebeneath to support said holders on the respective arms, a slotted lug on each said holder depending downwardly therefrom, a plurality of fingers each pivotally associated with a respective arm and entering into the slot provided in said lug of the respective holder on each arm, spring means acting on each said finger to urge the corresponding holder downwardly, means supporting said stars for rotation stepwise to move each arm thereof through successive stations, a dispensing device supported at a first station and adapted to deliver pourable material into a holder arrested at said first station, a control weigher supported at a second station to receive and weigh successive arrested holders, means for raising and lowering said star as a holder reaches each station, depending feet on each holder, the control weigher including needle supports to engage with the said feet of successive holders to support the same, free of the associated star arms, upon downward movement of the star, a fixed abutment at the second station positioned for engagement with said finger to release the same from engagement with said lug upon descent of said star, a make-up device supported at a third station and adapted to deliver pourable material into successive holders arrested at said third station, the make-up device being provided with means responsive to the weight of each holder as detected by said control weigher to control the amount of material delivered by said make-up device to each holder and means for discharging the material from each holder at a discharge station.

References Cited in the file of this patent
UNITED STATES PATENTS
2,901,209     Bardy et al. _____ Aug. 25, 1959